United States Patent
Krzyzanowski et al.

(10) Patent No.: US 7,668,990 B2
(45) Date of Patent: Feb. 23, 2010

(54) METHOD OF CONTROLLING A DEVICE TO PERFORM AN ACTIVITY-BASED OR AN EXPERIENCE-BASED OPERATION

(75) Inventors: Paul Krzyzanowski, Fanwood, NJ (US); Justin Flores, Boca Raton, FL (US); Glenn Harter, Wellington, FL (US)

(73) Assignee: OpenPeak Inc., Boca Raton, FL (US)

( * ) Notice: Subject to any disclaimer, the term of this patent is extended or adjusted under 35 U.S.C. 154(b) by 477 days.

(21) Appl. No.: 11/042,178

(22) Filed: Jan. 26, 2005

(65) Prior Publication Data

US 2005/0128048 A1   Jun. 16, 2005

Related U.S. Application Data

(63) Continuation-in-part of application No. 10/783,511, filed on Feb. 23, 2004, and a continuation-in-part of application No. 10/782,923, filed on Feb. 23, 2004, now Pat. No. 7,024,256, and a continuation-in-part of application No. 10/783,017, filed on Feb. 23, 2004, now Pat. No. 7,129,855, and a continuation-in-part of application No. 10/387,590, filed on Mar. 14, 2003.

(51) Int. Cl.
  *G06F 13/12* (2006.01)
  *G06F 3/00* (2006.01)
  *G06F 15/177* (2006.01)
(52) U.S. Cl. .............. 710/72; 710/8; 710/62; 709/220; 709/221; 709/222
(58) Field of Classification Search ............ 710/72, 710/8, 62; 709/220–222
See application file for complete search history.

(56) References Cited

U.S. PATENT DOCUMENTS 5,414,426 A   5/1995   O'Donnell et al.
5,519,878 A   5/1996   Dolin, Jr.

(Continued)

OTHER PUBLICATIONS

*Total Remote Software: Griffin Technology Downloads*, 1 page, printed from Internet—URL—http://www.griffintechnology.com/software/software_totalremote.html, (printed Feb. 23, 2004).

(Continued)

*Primary Examiner*—Niketa I Patel
(74) *Attorney, Agent, or Firm*—Sterne, Kessler, Goldstein & Fox P.L.L.C.

(57) ABSTRACT

Activity-based or experienced-based operations are created and defined during an initialization or setup session for one or more system component, with minimum or no user interaction. The system components include legacy and/or non-legacy devices, which are configured and managed within a controlled environment, such as a home or business peer-to-peer or client-server network. During an initialization or setup session, relevant device information and device metadata are collected via a conventional or discovery protocol interface. For a legacy device that is not automatically discoverable, a user adds the legacy device to the controlled environment by inputting the device information. The device information can also be automatically collected from an accessible database. Once the device information has been collected, the system components are configured to support one or more activity-based or experienced-based operations.

27 Claims, 12 Drawing Sheets

U.S. PATENT DOCUMENTS

| | | | |
|---|---|---|---|
| 5,537,463 | A | 7/1996 | Escobosa et al. |
| 5,552,917 | A | 9/1996 | Darbee et al. |
| 5,570,085 | A | 10/1996 | Bertsch |
| 5,689,353 | A | 11/1997 | Darbee et al. |
| 5,771,388 | A | 6/1998 | Mondrik et al. |
| 5,802,467 | A | 9/1998 | Salazar et al. |
| 5,805,812 | A | 9/1998 | Fish et al. |
| 5,875,108 | A | 2/1999 | Hoffberg et al. |
| 5,898,386 | A | 4/1999 | Kaihatsu |
| 5,926,108 | A | 7/1999 | Wicks et al. |
| 5,930,699 | A | 7/1999 | Bhatia |
| 5,953,144 | A | 9/1999 | Darbee et al. |
| 5,956,025 | A | 9/1999 | Goulden et al. |
| 5,956,487 | A | 9/1999 | Venkatraman et al. |
| 5,959,751 | A | 9/1999 | Darbee et al. |
| 5,963,624 | A | 10/1999 | Pope |
| 6,005,861 | A | 12/1999 | Humpleman |
| 6,026,150 | A | 2/2000 | Frank et al. |
| 6,032,202 | A | 2/2000 | Lea et al. |
| 6,049,711 | A | 4/2000 | Ben-Yehezkel et al. |
| 6,052,750 | A | 4/2000 | Lea |
| 6,085,236 | A | 7/2000 | Lea |
| 6,131,028 | A | 10/2000 | Whitington |
| 6,148,205 | A | 11/2000 | Cotton |
| 6,154,745 | A | 11/2000 | Kari et al. |
| 6,167,046 | A | 12/2000 | Terada et al. |
| 6,170,007 | B1 | 1/2001 | Venkatraman et al. |
| 6,198,479 | B1 | 3/2001 | Humpleman et al. |
| 6,199,066 | B1 | 3/2001 | Glitho et al. |
| 6,199,136 | B1 | 3/2001 | Shteyn |
| 6,208,341 | B1 | 3/2001 | van Ee et al. |
| 6,208,866 | B1 | 3/2001 | Rouhollahzadeh et al. |
| 6,218,931 | B1 | 4/2001 | Asghar et al. |
| 6,222,530 | B1 | 4/2001 | Sequeira |
| 6,223,348 | B1 | 4/2001 | Hayes et al. |
| 6,243,707 | B1 | 6/2001 | Humpleman et al. |
| 6,243,772 | B1 | 6/2001 | Ghori et al. |
| 6,259,707 | B1 | 7/2001 | Dara-Abrams et al. |
| 6,266,612 | B1 | 7/2001 | Dussell et al. |
| 6,275,865 | B1 | 8/2001 | Zou |
| 6,282,714 | B1 | 8/2001 | Ghori et al. |
| 6,288,716 | B1 | 9/2001 | Humpleman et al. |
| 6,292,554 | B1 | 9/2001 | Oden et al. |
| 6,317,028 | B1 | 11/2001 | Valiulis |
| 6,317,718 | B1 | 11/2001 | Fano |
| 6,321,092 | B1 | 11/2001 | Fitch et al. |
| 6,349,352 | B1 | 2/2002 | Lea |
| 6,359,636 | B1 | 3/2002 | Schindler et al. |
| 6,363,434 | B1 | 3/2002 | Eytchison |
| 6,388,399 | B1 | 5/2002 | Eckel et al. |
| 6,405,261 | B1 | 6/2002 | Gaucher |
| 6,463,343 | B1 | 10/2002 | Emens et al. |
| 6,496,135 | B1 | 12/2002 | Darbee |
| 6,512,754 | B2 | 1/2003 | Feder et al. |
| 6,563,430 | B1 | 5/2003 | Kemink et al. |
| 6,587,067 | B2 | 7/2003 | Darbee et al. |
| 6,597,374 | B1 | 7/2003 | Baker et al. |
| 6,600,421 | B2 | 7/2003 | Freeman |
| 6,642,852 | B2 | 11/2003 | Dresti et al. |
| 6,647,426 | B2 | 11/2003 | Mohammed |
| 6,728,784 | B1 | 4/2004 | Mattaway |
| 6,741,853 | B1 | 5/2004 | Jiang et al. |
| 6,748,343 | B2 | 6/2004 | Alexander et al. |
| 6,792,469 | B1 | 9/2004 | Callahan et al. |
| 6,914,551 | B2 | 7/2005 | Vidal |
| 2001/0000194 | A1 | 4/2001 | Sequeira |
| 2001/0018663 | A1 | 8/2001 | Dussell et al. |
| 2001/0036192 | A1 | 11/2001 | Chiles et al. |
| 2001/0041561 | A1 | 11/2001 | Ventulett et al. |
| 2001/0049275 | A1 | 12/2001 | Pierry et al. |
| 2001/0049846 | A1 | 12/2001 | Guzzi et al. |
| 2001/0053274 | A1 | 12/2001 | Roelofs et al. |
| 2001/0054060 | A1 | 12/2001 | Fillebrown et al. |
| 2001/0055954 | A1 | 12/2001 | Cheng |
| 2002/0006788 | A1 | 1/2002 | Knutsson et al. |
| 2002/0019984 | A1 | 2/2002 | Rakib |
| 2002/0022991 | A1* | 2/2002 | Sharood et al. ............... 705/14 |
| 2002/0031120 | A1 | 3/2002 | Rakib |
| 2002/0033760 | A1 | 3/2002 | Kobayashi |
| 2002/0034292 | A1 | 3/2002 | Tuoriniemi et al. |
| 2002/0035403 | A1 | 3/2002 | Clark et al. |
| 2002/0035404 | A1 | 3/2002 | Ficco et al. |
| 2002/0035605 | A1 | 3/2002 | McDowell et al. |
| 2002/0035621 | A1 | 3/2002 | Zintel et al. |
| 2002/0036795 | A1 | 3/2002 | Fujitani |
| 2002/0068984 | A1 | 6/2002 | Alexander et al. |
| 2002/0087746 | A1 | 7/2002 | Ludtke et al. |
| 2003/0103088 | A1 | 6/2003 | Dresti et al. |
| 2003/0105854 | A1 | 6/2003 | Thorsteinsson et al. |
| 2003/0163626 | A1 | 8/2003 | Chen et al. |
| 2003/0191826 | A1 | 10/2003 | Bellinger et al. |
| 2003/0204582 | A1 | 10/2003 | Shimoda et al. |
| 2003/0207668 | A1 | 11/2003 | McFarland et al. |
| 2003/0208595 | A1 | 11/2003 | Gouge et al. |
| 2003/0220988 | A1 | 11/2003 | Hymel |
| 2003/0224735 | A1 | 12/2003 | Moursund et al. |
| 2003/0224807 | A1 | 12/2003 | Sinha et al. |
| 2003/0236890 | A1 | 12/2003 | Hurwitz et al. |
| 2004/0003051 | A1 | 1/2004 | Krzyzanowski et al. |
| 2004/0003073 | A1 | 1/2004 | Krzyznowski et al. |
| 2004/0046677 | A1 | 3/2004 | Dresti et al. |
| 2004/0047347 | A1 | 3/2004 | Worry et al. |
| 2004/0054789 | A1 | 3/2004 | Breh et al. |
| 2004/0071136 | A1 | 4/2004 | Laumen et al. |
| 2004/0098456 | A1 | 5/2004 | Krzyzanowski et al. |
| 2005/0015764 | A1 | 1/2005 | Gaur |
| 2005/0108369 | A1* | 5/2005 | Sather et al. ............... 709/220 |

OTHER PUBLICATIONS

*Total Remote v2.0 user guide*, 29 pages, printed from Internet—URL—http://www.griffintechnology.com/downloads/pdf/manuals/Total_Remote_user_manual.pdf, (printed Feb. 23, 2004).

International Search Report for International Application No. PCT/US03/20189, Issued on Oct. 29, 2003.

"*Global Caché GC-100 Network Adapter—Control & Automate Common Devices Over A Network*" *GC-100 Network Adapter*, URL http://wwwglobalcache.com/products/gc-index.html, Oct. 11, 2004, 2 pages.

"*GC-100 Key Features and Benefits*" *GC-100 Network Adapter*, URL http://wwwglobalcache.com/products/gc-features.html, Oct. 11, 2006, 2 pages.

"*Global Caché GC-100 Network Adapter—Control & Automate Common Devices Over A Network*", Product Data Sheet, 2 pages, 2004.

"*IPL T SFI244, Two Serial, Four Flex I/O, and Four IR Port IP Link™ Ethernet Control Interface With IR Learner*", Extron IPL T SF1244 IP Link™ Products, URL http://www.extron.com/product/product.asp?id=ipltsfi244&version=print, Oct. 11, 2004, 6 pages.

"*Creston Introduces RMC2e "Mini" Control System*" *Home Toys New Release*, URL http://www.hometoys.com/releases/mar03/creston_02.html, Oct. 14, 2004, 2 pages.

"*Troy Serial Server*," URL, http://www.troygroup.com/Connectivity/products/SerialDeviceConnectivity/SerialServers.asp, downloaded Jul. 9, 2004, 2 pages.

"*Troy Serial Servers*," URL, http://www.troygroup.com/Connectivity/products/DataSheets/Troy%20Serial%20Server%20data%20sheet.pdf, downloaded Jul. 9, 2004, 1 page.

"*EtherWind™ 802.11b™ Wireless Print Server*", URL http://www.troygroup.com/wireless/documents/datasheets/TROYU%20EtherWind.pdf, Nov. 19, 2003, 2 pages.

"EtherWind™ IEEE 802.11b Wireless Print Server", URL http://www.troygroup.com/wireless/products/wireless/etherwind.asp, Nov. 19, 2003, 3 pages.

"Troy Wireless Introduces EtherWind-Plus 802.11b Wireless OEM Board-Level Product; New Product Enables Wireless and Ethernet Connectivity on OEM Devices", URL http://www.troygroup.com/wireless/company/news/081302.asp, Nov. 19, 2003, 2 pages.

"EtherWind-Plus™ 802.11b OEM Module", URL http://www.troygroup.com/wireless/documents/datasheets/TROY%20EtherWind%20Plus%20data%20sheet.pdf, Nov. 19, 2003, 2 pages.

"EtherWind-Plus™ IEEE 802.11b OEM Connectivity Module", URL http://www.troygroup.com/wireless/products/wireless/etherwindplus.asp, Nov. 19, 2003, 2 pages.

"Pronto RF Extender, RFX 6000, Pronto accessory for operating devices inside a closed cabinet, closet or even in another room", URL http://www.pronto.philips.com/index.cfm?id=577f, Nov. 19, 2003, 2 pages.

"Pronto RF Extender, RFX 6000, RF extender for TSU6000 & TSU3000", URL http://www.remotecontrol.philips.com/library/documents/SPEC_RFX6000.pdf, Nov. 19, 2003, 2 pages.

"Harmony Remote—Overview", URL http://www.harmonyremote.com/product_overview.htm, downloaded from the World Wide Web on Feb. 9, 2004, 2 pages.

"Harmony Remote—Features", URL http://www.harmonyremote.com/product_features.htm, downloaded from the World Wide Web on Feb. 9, 2004, 5 pages.

"Specifications for Harmony Remote", URL http://www.harmonyremote.com/product_specifications.htm, downloaded from the World Wide Web on Feb. 9, 2004, 2 pages.

"Harmony Remote—Frequently Asked Questions", URL http://www.harmonyremote.com/faq.htm, downloaded from the World Wide Web on Feb. 9, 2004, 2 pages.

"Harmony Remote SST-659", published at http://www.harmonyremote.com, downloaded from the World Wide Web on Feb. 9, 2004, 1 page.

"Harmony Remote SST-748", published at http://www.harmonyremote.com, downloaded from the World Wide Web on Feb. 9, 2004, 1 page.

"Harmony Remote SST-768f", published at http://www.harmonyremote.com, downloaded from the World Wide Web on Feb. 9, 2004, 1 page.

"Harmony Remote SST-659 User Manual", dated Oct. 16, 2003, published at http://www.harmonyremote.com, downloaded from the World Wide Web on Feb. 9, 2004, 20 pages.

"Harmony Remote SST-768 User Manual", dated Mar. 25, 2003, published at http://www.harmonyremote.com, downloaded from the World Wide Web on Feb. 9, 2004, 37 pages.

* cited by examiner

METHOD OF CONTROLLING A DEVICE TO PERFORM AN ACTIVITY-BASED OR AN EXPERIENCE-BASED OPERATION

CROSS-REFERENCE TO RELATED APPLICATIONS

This application is a continuation-in-part of U.S. patent application Ser. No. 10/783,511, filed Feb. 23, 2004, by Killian et al., entitled "User Interface for Multi-Device Control," incorporated herein by reference in its entirety.

This application is also a continuation-in-part of U.S. patent application Ser. No. 10/782,923, filed Feb. 23, 2004, by Krzyzanowski et al., entitled "Method, System, and Computer Program Product for Automatically Managing Components within a Controlled Environment," incorporated herein by reference in its entirety.

This application is also a continuation-in-part of U.S. patent application Ser. No. 10/783,017, filed Feb. 23, 2004, by Krzyzanowski et al., entitled "Device Control System, Method, and Apparatus," incorporated herein by reference in its entirety.

This application is also a continuation-in-part of U.S. patent application Ser. No. 10/387,590, filed Mar. 14, 2003, by Krzyzanowski et al., "Legacy Device Bridge for Residential or Non-Residential Networks," incorporated herein by reference in its entirety.

BACKGROUND OF THE INVENTION

1. Field of the Invention

The present invention relates generally to control of consumer electronics, and more specifically, to a process for creating activity or experience-based operations for controlling consumer electronics.

2. Related Art

The installation of computer networks (for homes and businesses) presents several challenges. For example, installing a computer network can be time extensive and expensive to deploy. Additionally, there is no easy method to integrate, for example, home computer networks with other residential devices, such as televisions, stereos, DVD players, and other home electronics. Being able to efficiently distribute digital audio/video (AV) data among personal computers and other AV devices (such as, televisions, DVD players, PVRs, etc.) is complicated by differing and evolving communications standards and/or formats.

Another significant challenge is being able to effectively control networked residential devices. Although a remote control unit (RCU) can be trained to send signals to components of an entertainment center (such as, a television, stereo, and DVD player), a conventional RCU cannot communicate and control multiple personal computers and other analog and/or digital devices at a residence. In addition, a conventional RCU cannot communicate and control multiple residential devices without user intervention. Even with a conventional RCU, a user must manually activate a hard key to send a command (in the form of infrared signals) to a controllable consumer electronic (CE) device having direct line-of-sight connectivity with the RCU.

A conventional RCU suffers from other serious deficiencies that limit its usefulness without constant user intervention. For instance in the "set up" process of a conventional RCU, the user can program the device by assigning a particular key with a series of key strokes that are stored in the RCU's memory. However, the user cannot inform the RCU of critical operational information of the controllable devices (e.g., television, DVD player, etc.).

Such critical operational information includes the input state (i.e., what signals are coming into what input).

For example, if a television is set to the tuner input (instead of the input for receiving DVD data) when a RCU is operated to play a DVD installed in a DVD player, the television will display the broadcast channel to which it is tuned at the time, and not the desired DVD. The user must physically select the proper input by cycling through the available inputs using the input selection button. The lack of input state information also precludes the user from switching between different activities (e.g., watching DVD, watching broadcast TV, watching cable) without also physically changing from the current input state to the new state, thereby placing the television in the proper input state.

Although the combination of improved computer processing capabilities and global access to information has resulted in significant advancements in the information processing age, there exists a need for a simple, inexpensive, yet versatile system that can integrate the functions of multiple residential devices connected to a residential network and facilitate the operations of these devices with minimal user intervention.

SUMMARY OF THE INVENTION

A method, system, and computer program product are provided to configure and manage a plurality of system components within a controlled environment, such as a home, business, school, etc, as well as its surrounding areas. The system components include legacy and/or non-legacy devices, and the controlled environment includes a peer-to-peer communications system and/or a client-server network.

In an embodiment of the present invention, "activity-based" or "experienced-based" operations are created and defined during an initialization or setup session for a system component, with minimum or no user interaction. The activity-based or experienced based operations include favorite settings, playlists, security protocols, context-sensitive operations, user-specific operations, follow-me system controls, control macros (including context-based control macros), or the like.

For non-legacy devices, relevant information about the system component is collected via a discovery protocol interface. For legacy devices, a variety of system interfaces are provided for receiving the relevant information.

In an embodiment, the system components (both legacy and non-legacy devices) are added, removed, or configured via a setup wizard. During this initialization or setup process, relevant device information (e.g., device type, make, model, region assignment, etc.) is automatically discovered or added by user input. For a legacy device that is not automatically discoverable, the user adds the legacy device by identifying the device (by device type, make, model, etc.) and assigning the device to a particular room/region.

The initialization or setup process is also designed to acquire "device metadata," which includes basic operational information or idiosyncrasies about each new device (such as, tuning rules, types and order of inputs, etc.). The concept of metadata is further described in the application entitled "Device Control System, Method, and Apparatus" (U.S. patent application Ser. No. 10/783,017). The present invention includes mechanisms for optimizing the collection of device metadata with little or no human intervention. In an embodiment, a series of questions or informational prompts are dynamically optimized to avoid seeking irrelevant or unnecessary information. In an embodiment, device metadata is contained in an accessible database. As such, the setup process can be tailored and streamlined based on the type and model number of the system component being added or configured. The setup process is dynamically tailored to seek only that which is specific to and necessary to control the particular system component in light of its user-specific configuration.

Once the device information (including device metadata) has been collected, the system components (e.g., the assigned legacy and non-legacy devices) are configured to support one or more activity-based or experienced-based operations.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable one skilled in the pertinent art(s) to make and use the invention. In the drawings, generally, like reference numbers indicate identical or functionally or structurally similar elements. Additionally, generally, the leftmost digit(s) of a reference number identifies the drawing in which the reference number first appears.

DETAILED DESCRIPTION OF THE INVENTION

I. Overview

Figure 1:
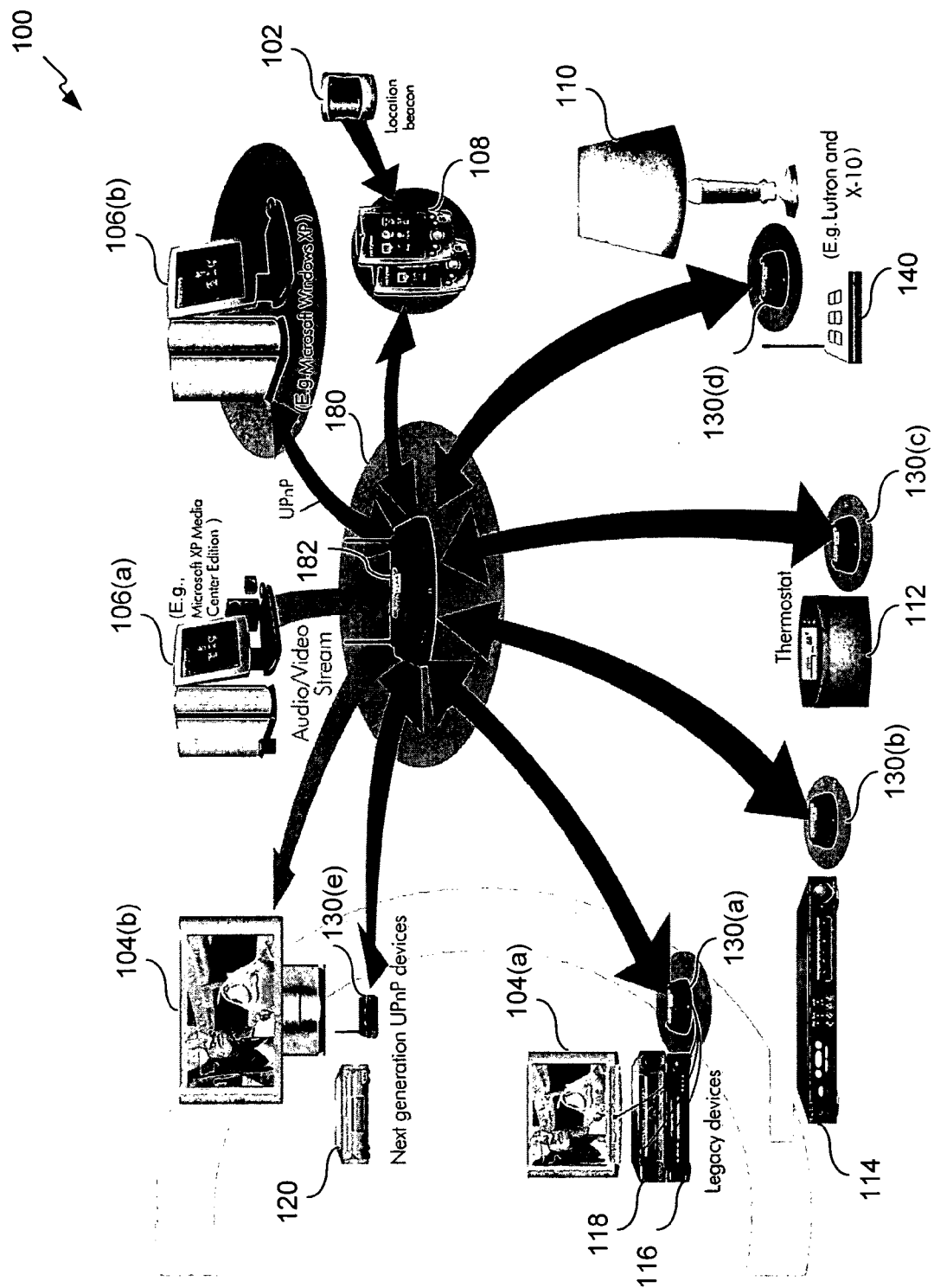
FIG. 1 illustrates a residential controlled system according to an embodiment of the present invention.

The present invention describes methodologies and/or techniques for configuring and managing a system component of a controlled environment (such as, a residence, business, school, or the like). The controlled environment can be implemented with a peer-to-peer communications system and/or a client-server network. The system component includes legacy as well as non-legacy devices. A "non-legacy" device is defined herein to include any type of device or peripheral that is capable of communicating via a discovery protocol interface (e.g., interfaces defined by the Universal Plug and Play (UPnP™) Forum). Having a discovery protocol interface, non-legacy devices are specially adapted for discovery and control by other devices. A "legacy device," on the contrary, is defined herein to include any type of device or peripheral that is not capable of communicating via a discovery protocol interface. Lacking a discovery protocol interface, legacy devices, therefore, are not conventionally adapted for discovery and control by other devices.

According to embodiments of the present invention during the initialization or setup phase, the system component is configured to perform one or more activity-based or experienced-based operations with minimum or no user interaction. For non-legacy devices, relevant information about the system component is collected via a discovery protocol interface. For legacy devices, a variety of system interfaces are provided for receiving the relevant information, as described in greater detail below.

In an embodiment, the activity-based or experience-based operations include one or more "favorite" settings for the system component. For example, a favorite setting can be established for television programming, audio/video recordings, room temperature, hot tub controls, clock alarms, light/dimmer settings, web sites, news broadcasts, financial channels, or the like.

In another embodiment, the activity-based or experience-based operations include one or more "playlists" for the system component. For example, a series of video or audio recordings can be prepared and/or stored for playback on, for example, a television, monitor, or audio client. A sequence of graphic images or photographs can be prepared and/or stored for playback on, for example, a monitor or computer client. A playlist of other forms of media and/or multimedia can also be created according to embodiments of the present invention.

In another embodiment, the activity-based or experience-based operations include one or more "security" protocols for the system component. For example, the system component can be configured to block certain content from being accessed by a designated user. Non-adult users, for instance, can be prevented from accessing designated television channels, web sites, areas (such as, lockable rooms, drawers, safes, etc.), or the like.

In another embodiment, the activity-based or experience-based operations are "context-sensitive". The system component can have one or more configurations based on a particular context. Depending on the type of system component, a configuration can be established for evening entertainment, which includes, without limitation, presets for lighting, audio/video presentations, security access warnings, hot tub controls, or the like. Another configuration can be established for home office activities, which includes, without limitation, presets for a baby monitor, a playlist of classical recordings, coffee maker timer controls, or the like. A configuration can be established for morning rituals, which includes, without limitation, presets for alarm/snooze controls, coffee maker timer controls, lighting, news broadcasts, or the like.

In another embodiment, the activity-based or experience-based operations are "user-specific". For example, a user-specific configuration can be established with security controls set to block certain televisions programming, web sites, audio recordings, or the like when in the company of minors. However, when in the company of adults, a configuration can be established with a lower security setting.

In another embodiment, the activity-based or experience-based operations include "follow-me" system controls. For instance, "follow-me video" is implemented to transfer a selected video production to various displays throughout the controlled environment. As a user migrates from room to room within the controlled environment, the user, or a system component in communications with the user, is tracked to determine the user's current location, and a display (e.g., monitor or television) positioned in the current location will automatically start to present a pre-selected video production. Similarly, the activity-based or experience-based operations can include "follow-me audio," "follow-me lighting," or the like.

In another embodiment, the activity-based or experience-based operations are defined by one or more control macros. A control macro includes a set of commands that, when executed, enables a controller to control multiple operations and/or functions of one or more system components. In an embodiment, the set of commands are stored in a central location and are associated with a generic command. When activated, the generic command retrieves and transmits the set of commands to the appropriate system component(s) for execution. In other words, the present invention enables a remote or portable controller to transmit a single high-level request to a centralized command center (which can be coupled to another computer). The centralized command center interprets the single request and finds the corresponding sequence of commands that needs to be transmitted to the appropriate system component(s).

In an embodiment, the control macro is defined to execute automatically upon the occurrence of a commencement parameter. The commencement parameter can be a pre-defined time, date, state, event, or the like, or any combination thereof. For example, a pre-defined sequence of control commands can be executed upon the occurrence of a pre-set time (i.e., clock based) and/or date (i.e., calendar based) automatically (i.e., without direct user intervention). A user can desire to have the bedroom television automatically turned on and tuned to a particular channel at 6:30 am as part of his or her "wake up" routine. In another example, a pre-defined sequence of control commands can be executed upon the occurrence of a particular event or the occurrence of a particular system or component state. A control macro can be automatically executed when, for example, a television in the family room has been powered on.

In an embodiment, the control macro is defined to be automatically particularized for application in a specific context. Herein referred to as a "context-based control macro", a control macro can be particularized for use in any context (e.g., any region, or any device of comparable type). In other words, a specific system component or combination of components is not identified in the control macro. A context-based control macro is defined by specifying the "type" of system component that is required to perform the activity-based or experienced-based operation. Upon activation, the control macro is interpreted to select the appropriate system component(s). In an embodiment, the system component is selected by determining the current location of the user (or a system component in communications with the user). In another embodiment, the user interacts with a remote or portable controller to specify the appropriate system component(s) at the time of activating the context-based control macro.

The above-mentioned activity-based or experience-based operations have been provided by way of example and not limitation. Other types of activity-based or experienced-based operations can be used and are intended to be within the scope of the present invention. Additional examples of activity-based or experience-based operations (including further descriptions of the above-mentioned operations) are described in the application entitled "Method, System, and Computer Program Product for Automatically Managing Components within a Controlled Environment" (U.S. patent application Ser. No. 10/782,923), which is incorporated herein by reference in its entirety; and in U.S. Pat. No. 6,792,323 to Krzyzanowski et al., which is incorporated herein by reference in its entirety As described in greater detail below, activity-based or experienced-based operations are created and defined during an initialization or setup session, and are executed with the function and/or operation of system components, including consumer electronic (CE) devices. The activity-based or experienced-based operations support the control of multiple devices of the same type (e.g., two DVD players). The activity-based or experienced-based operations also support the segmentation of devices among multiple rooms (e.g., a television in a living room versus a television in a bedroom); the control of non-IR, networked devices (such as devices having a discovery protocol interface); the control of devices beyond line-of-sight (via a wireless network); and setup directly on a remote control device (as opposed to a fixed stationary interface).

II. Example Controlled Environment

The present invention can be implemented in any type of controlled environment, such as a residence, business, school, or the like. A residential controlled environment includes the confines of a home, apartment, mobile home, houseboat, or other types of residences. However in embodiments, a residential environment includes the surrounding area of the residence, as well as any shelters, constructs, improvements, or the like, within a designated perimeter.

In other embodiments, the present invention is implemented in a non-residential environment. A non-residential environment includes, but is not limited to, an office complex, suite of small offices, production studio, warehouse, entertainment arena, school or university, health care facility, hotel, vacation resort, aircraft, ship, automobile, or the like. In embodiments, the controlled environment for a non-residential embodiment includes not only the actual confines of the aforementioned structures but also their surroundings within a designated perimeter.

Examples of a controlled environment are described in the application entitled "Method, System, and Computer Program Product for Managing Controlled Residential or Non-Residential Environments" (U.S. patent application Ser. No. 10/382,897), and the application entitled "Method, System, and Computer Program Product for Managing Controlled Residential or Non-Residential Environments," (U.S. patent application Ser. No. 10/180,500), both of which are incorporated herein by reference in their entireties. As described in these applications, various methods and systems can be provided to manage the distribution of information (including video, audio, voice, text, graphics, control messages, etc.) to other devices and/or applications within the controlled environment. Such devices and/or applications include, but are not limited to, communications equipment (such as, telephones, intercoms, etc.), entertainment systems (such as, televisions, CD/DVD players, gaming applications, stereos, etc.), monitoring systems (such as, security cameras, baby monitors, etc.), safety/security systems (such as, fire alarms, sprinkler systems, locks on doors or windows, etc.), personal computers (such as, desktops, notebooks, notepads, personal digital assistants, etc.), cooking appliances (such as, ovens, coffee makers, electrical food/beverage warmers, etc.), comfort systems (such as, heating and air conditioning (HVAC), humidifiers, dehumidifiers, air purifiers, light switches, light dimmers, etc.), power outlets, power supplies, or the like.

An example of such controlled environments is shown in FIG. 1, which illustrates a residential controlled system 100 according to an embodiment of the present invention. System 100 includes a communications network 180 that interconnects a plurality of system components. The system components include a positioning unit 102, two televisions 104 (shown as television 104(a) and 104(b)), two computer clients 106 (shown as computer client 106(a) and computer client 106(b)), a portable controller 108, a lighting device 110, a thermostat 112 for a HVAC system, a tuner 114, a media player 116, a cable box 118, a digital satellite system (DSS) box 120, and a wireless lighting control interface (such as a Lutron or X10 transceiver) 140. Other devices and/or applications can also be included as system components.

Positioning unit 102 designates spatial locations within the residence that serves as the hosting environment for system 100. Positioning unit 102 is coupled to the other system components (e.g., portable controller 108) via a wired and/or wireless interface. Positioning unit 102 is operable to designate a floor or room within the residence. Positioning unit 102 is also operable to designate a specific location or region within a floor or room. Moreover, positioning unit 102 can be situated outside of the residence to thereby, designate external areas of the residence.

Computer client 106 includes a wired and/or wireless personal computer, personal digital assistant (PDA), enhanced telephone, personal television, or other data processing device linked to communications network 180. As a personal computer, computer client 106 can be a desktop, notebook, notepad, or the like.

Portable controller 108 is a wired and/or wireless data processing device that enables a user to interact with, send control messages to, and/or manage the distribution of information (including audio, video, voice, and other data) among the other system components. Portable controller 108 can be a portable version of the devices listed as computer client 106. For example, portable controller 108 can be a personal notebook or notepad computer, PDA, enhanced telephone, or other device linked to communications network 180 and including a display with the ability to interact with the other system components. Hence, portable controller 108 enables a user to remotely control the operations of various components of system 100. In an embodiment, the display for portable controller 108 is capable of receiving video and/or audio from the other system components. In an embodiment, portable controller 108 includes a flash ROM that enables wireless downloads and/or uploads.

Television 104 is a conventional television. In an embodiment, television 104 is enhanced to support interactive and/or personal services. Personal services include virtual recording, programming, pausing/rewinding live broadcasts, or the like. For example, television 104 can be a personal television enhanced to support the MSN® TV service, hosted by WebTV Networks, Inc. (Mountain View, Calif.), that supports the WEBTV® services available from Microsoft Corporation (Redmond, Wash). As shown, television 104 can be connected to cable set-top box 118, DSS set-top box 120, and/or media player 116 (e.g., PVR, VCR, or DVD player).

The aforementioned system components are not intended to be exhaustive. Other devices (including appliances), applications, and/or the like can be implemented, including, but not limited to, a refrigerator, stove, microwave, toaster, coffee-maker, alarm clock, humidifiers, sprinkler system, lighting, light dimmers, etc. In an embodiment, portable controller 108 controls the operations and/or functions of such components, such as on/off, timers, modulation (e.g., oven temperatures, etc.), pause, snooze, etc.

As discussed, communications network 180 provides a transmission medium for communicating among the system components. Communications network 180 is a wired and/or wireless local area network (LAN). Thus, communications network 180 includes wired, wireless, or both transmission media, including satellite, terrestrial (e.g., fiber optic, copper, UTP, STP, coaxial, hybrid fiber-coaxial (HFC), or the like), radio, microwave, free-space optics, and/or any other form or method of transmission.

Figure 2:
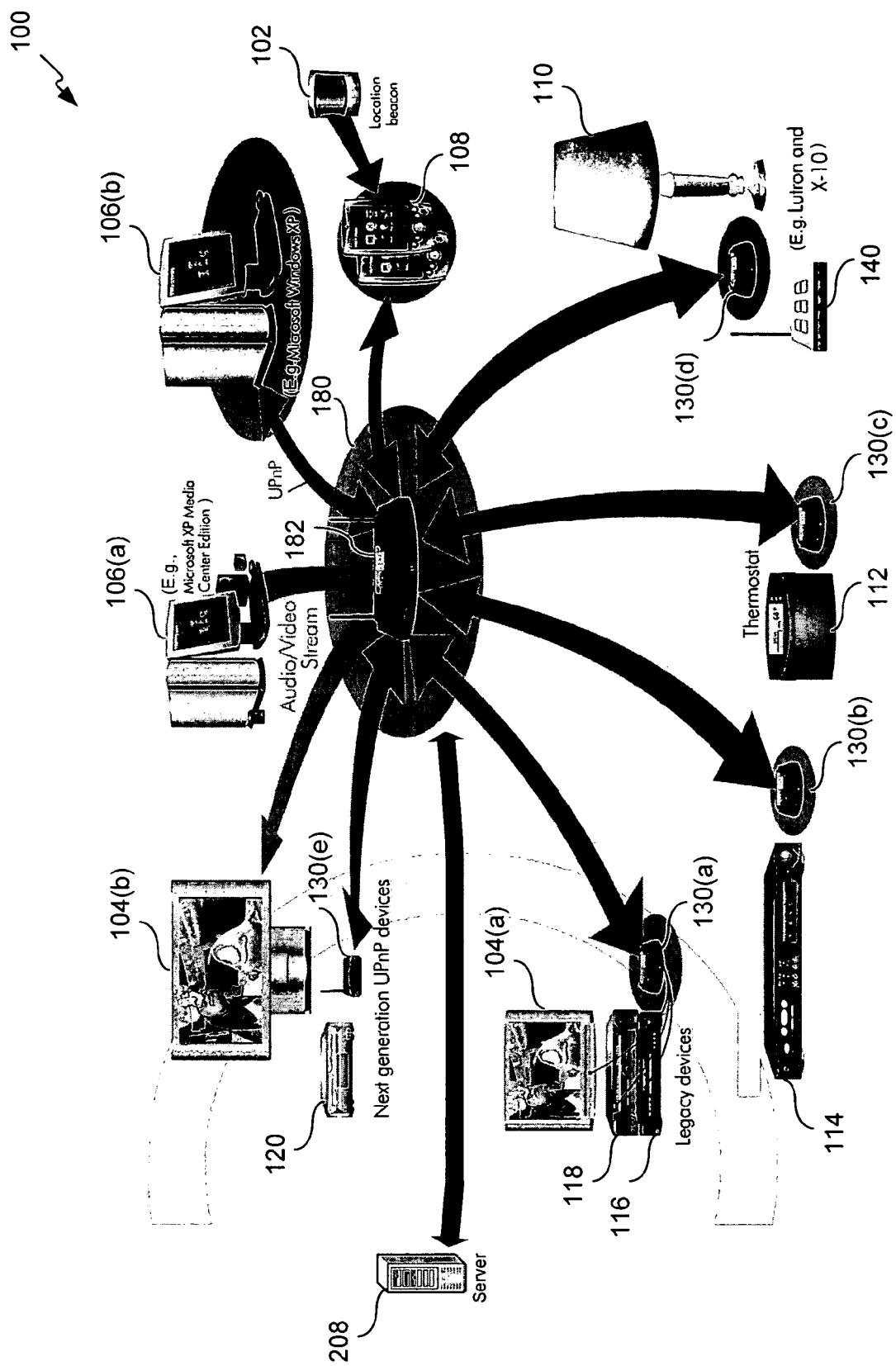
FIG. 2 illustrates a residential controlled system according to another embodiment of the present invention.

As shown in FIG. 1, communications network 180 supports peer-to-peer communications. However, the present invention also supports client-server networks. FIG. 2 illustrates another embodiment of residential controlled system 100 that includes at least one server 208. Server 208 polices all traffic among the other system components. The exchange of information among the system components is routed or otherwise controlled via server 208. As such, server 208 interacts with other system components to directly or indirectly distribute data (including audio and/or video), voice, and/or control messages over communications network 180. In an embodiment, server 208 commands and controls the operations and/or functions of one or more of the other systems components. The functions managed by server 208 include video serving, audio serving, telephony, messaging, file sharing, Internet access, and security. According to embodiments of the present invention, a user operates portable controller 108 to establish or reconfigure these functions and/or receive media from server 208 or other systems components or indirectly from the system components via server 208.

In an embodiment, portable controller 108 includes several functions of server 208, as described herein, and manages the distribution of information (including audio, video, voice, and other data) among the other system components. In another embodiment supporting peer-to-peer communications, the system components exchange audio, video, voice, other data, and/or control messages directly with each other and without being centrally managed.

In an embodiment using a wired transmission medium, communications network 180 is an Ethernet LAN having a CAT-5 cable, or the like, distributed to each system component, such as television 104, media player 116, etc. The system component includes an audio/video (AV) connector that is responsive to receive the cable. In an embodiment, communications network 180 includes a telephone line and/or powerline (such as the communications technologies made available from the Home Phone Networking Alliance (HomePNA) or the like).

In an embodiment using a wireless transmission medium, communications network 180 supports the IEEE standard 802.11(a), which specifies a wireless Ethernet protocol for large-sized video. In another wireless embodiment, communications network 180 supports the IEEE standard 802.11(b), which specifies a wireless Ethernet protocol for small-size video. In another wireless embodiment, communications network 180 supports the IEEE standard 802.11(g). In another embodiment, the BLUETOOTH™ wireless technology (developed by Bluetooth SIG, Inc.) is used to support short-range wireless interfaces with system 100.

As shown in FIG. 1 and FIG. 2, communications network 180 includes a wireless network access point 182, such as those available from Linksys, a division of Cisco Systems, Inc. (San Jose, Calif.), as a platform for the system components. A wireless access point 182 provides a central point for connectivity in a wireless network and always-on connectivity necessary for tracking states of the system components. Additionally, a wireless access point 182 can provide a connection point between a wired and wireless network. In an embodiment using a server, as discussed above, a wireless access point 182 serves as a platform for server 208. In alternative server-based embodiments of the present invention, server 208 can actually be located on a number of different device platforms in addition to a wireless access point (such as, wireless access point 182), including a bridge device (such as, bridges 130(*a*)-130(*e*)), a personal digital assistant, a personal computer, or the like.

System 100 also includes a plurality of infrared/serial bridges 130(*a*)-130(*d*), which comply with the IEEE 802.11 (b) standard for wireless communications. Each infrared/serial bridge 130 interacts with one or more components. As shown, infrared/serial bridge 130(*a*) interacts with television 104(*a*), cable box 118, and media player 116. Infrared/serial bridge 130(*b*) interacts with tuner 114 or any type of proprietary device that rely on infrared/serial communications protocols as would be apparent to one skilled in the relevant art(s). Infrared/serial bridge 130(*c*) interacts with thermostat 112. Infrared/serial bridge 130(*d*) interacts with lighting device 110. A wireless-Ethernet bridge 130(*e*) interacts with television 104(*b*) and a DSS box 120. Wireless-Ethernet bridge 130(*e*) can support any IP addressable device. As such, television 104(*b*) and DSS box 120 are "next generation" plug and play devices that have IP addresses.

Therefore, the present invention can integrate legacy devices (e.g., CE devices that rely on infrared/serial communications protocols), as well as devices having a discovery protocol interface (e.g., devices defined by the UPNP™ Forum) as system components. An example of a controlled environment implementing an IEEE 802.11(b) infrared/serial bridge is described in the application entitled "Legacy Device Bridge for Residential or Non-Residential Networks" (U.S. patent application Ser. No. 10/387,590), which is incorporated herein by reference in its entirety.

In an embodiment of the present invention, a "virtual plug and play protocol interface" enables a legacy device to function similarly to a device having a conventional "plug and play" protocol interface. For example, one or more bridges 130(*a*)-130(*e*) can be modified to include a virtual plug and play protocol interface that enables a legacy device, such as a conventional CE device, to be advertised to and controlled by non-legacy system components as if the legacy device were compliant with, for example, a packet-based discovery and control protocol, such as those defined by the UPnP™ Forum. As would be appreciated by one skilled in the relevant art(s), the UPnP™ Forum is an open industry standard that uses Internet and Web protocols to enable devices such as personal computers, peripherals, intelligent appliances, and wireless devices to be connected to a controlled environment (such as, system 100) and to become automatically aware of each other. In accordance with a plug and play protocol (such as the UPnP™ Forum), when a user plugs a non-legacy device into a controlled environment (e.g., system 100), the device configures itself, acquires a TCP/IP address, and uses a discovery protocol based on the Hypertext Transfer Protocol (HTTP) to announce its presence to other devices on within the controlled environment (e.g., system 100). Other plug-and-play-compliant network entities can then negotiate a communications protocol with the device, determine its capabilities, and control it. Note that although this embodiment is described with respect to the UPnP protocol, the present invention is not limited to the UPnP protocol, but also encompasses other standards-based discovery protocols, such as the Rendezvous™ protocol, developed, in part, by Apple Computer, Inc. of Cupertino, Calif. The present invention also encompasses proprietary discovery protocols designed for specific network devices. For example, the Panasonic® KX-HCM250 Wireless Network Camera, sold by Matsushita Electric Industrial Co. Ltd. of Osaka, Japan, employs a proprietary protocol for discovery and control of that device in a network.

In an embodiment of the present invention, one or more bridges 130(*a*)-130(*e*) act as a plug and play proxy for a piece of legacy equipment and is herein referred to as a "plug-and-play-enhanced" bridge 130(*a*)-130(*e*). The "plug-and-play-enhanced" bridge 130(*a*)-130(*e*), therefore, includes a virtual plug and play protocol interface that enables the plug-and-play-enhanced bridge 130(*a*)-130(*e*) to advertise itself to other network entities as a conventional plug and play device, exhibiting attributes similar to the legacy device that is communicatively connected to it. When plug and play commands arrive from the network (e.g., network 180), plug-and-play-enhanced bridge 130(*a*)-130(*e*) translates them into an appropriate set of commands for controlling the legacy device, such as IR commands or serial commands. Note that although this embodiment is described with respect to plug and play virtualization, the present invention is not limited to plug and play virtualization, but also encompasses legacy device virtualization in accordance with other packet-based discovery and control protocols, including but not limited to Jini™, developed by Sun Microsystems of Santa Clara, Calif., or the Rendezvous™ protocol, which is an open protocol developed, in part, by Apple Computer, Inc. of Cupertino, Calif.

Therefore in an embodiment, bridges 130(*a*)-130(*e*) are provided to "control" legacy system components. In another embodiment, bridges 130(*a*)-130(*e*) are enhanced with a virtual plug and play protocol interface to enable "discovery and control" of legacy system components within system 100. It should be noted that the wireless aspects of the present invention is not restricted to infrared communications. In other embodiments, bridges 130(*a*)-130(*e*) support other modes of wireless communications (e.g., RF, WiFi, BLUETOOTH™, etc.) that enable discovery and/or control of legacy system components. In another embodiment, a bridge 130(*a*)-130(*e*) is modified to enable discovery and/or control of legacy system components over a wired interface (e.g., serial or parallel) with other system components of system 100. In other embodiments, a bridge 130(*a*)-130(*e*) can support a wired interface to a legacy system component and a wireless interface to another system components, a wireless interface to a legacy system component and a wired interface to other system components, wireless interfaces to both the legacy system component and other system components, and/or wired interfaces to both the legacy system component and other system components.

III. Setup Optimization

Figure 3:
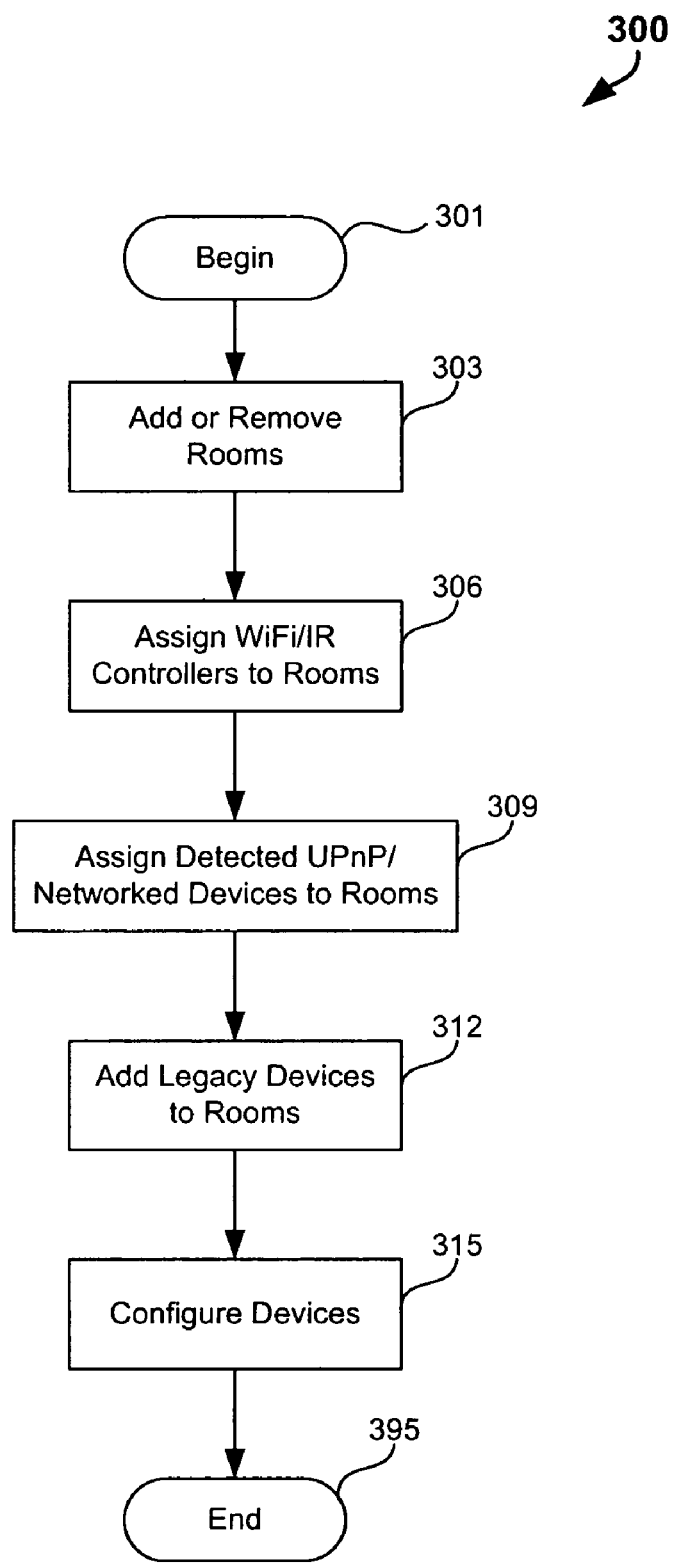
FIG. 3 illustrates an operational flow for initializing system components in a controlled environment according to an embodiment of the present invention.

In an embodiment of the present invention, activity-based or experienced-based operations are created and defined during an initialization or setup session with minimum or no user interaction, and are executed with the function and/or operation of various system components. This can be explained with reference to FIG. 3, where flowchart 300 represents the general operational flow of an embodiment of the present invention for initializing or setting-up the system components in a controlled environment, such as system 100. More specifically, flowchart 300 shows an example of a control flow for establishing activity-based or experienced-based operations during the initialization or setup phase. Although the control flow is being described with reference to a "residential" controlled environment, it should be understood that flowchart 300 can also be expanded to support non-residential environments.

The control flow of flowchart 300 begins at step 301 and passes immediately to step 303. At step 303, a room or region within the controlled environment (e.g., system 100) is designated. In an embodiment, a control screen is presented on a display device to enable a user to perform this operation. The control screen, therefore, enables the user to add, remove, and/or configure a system component for the controlled environment. In an embodiment, a set-up wizard allows the user to navigate among a plurality of control screens to add or configure system components.

Figure 4A:
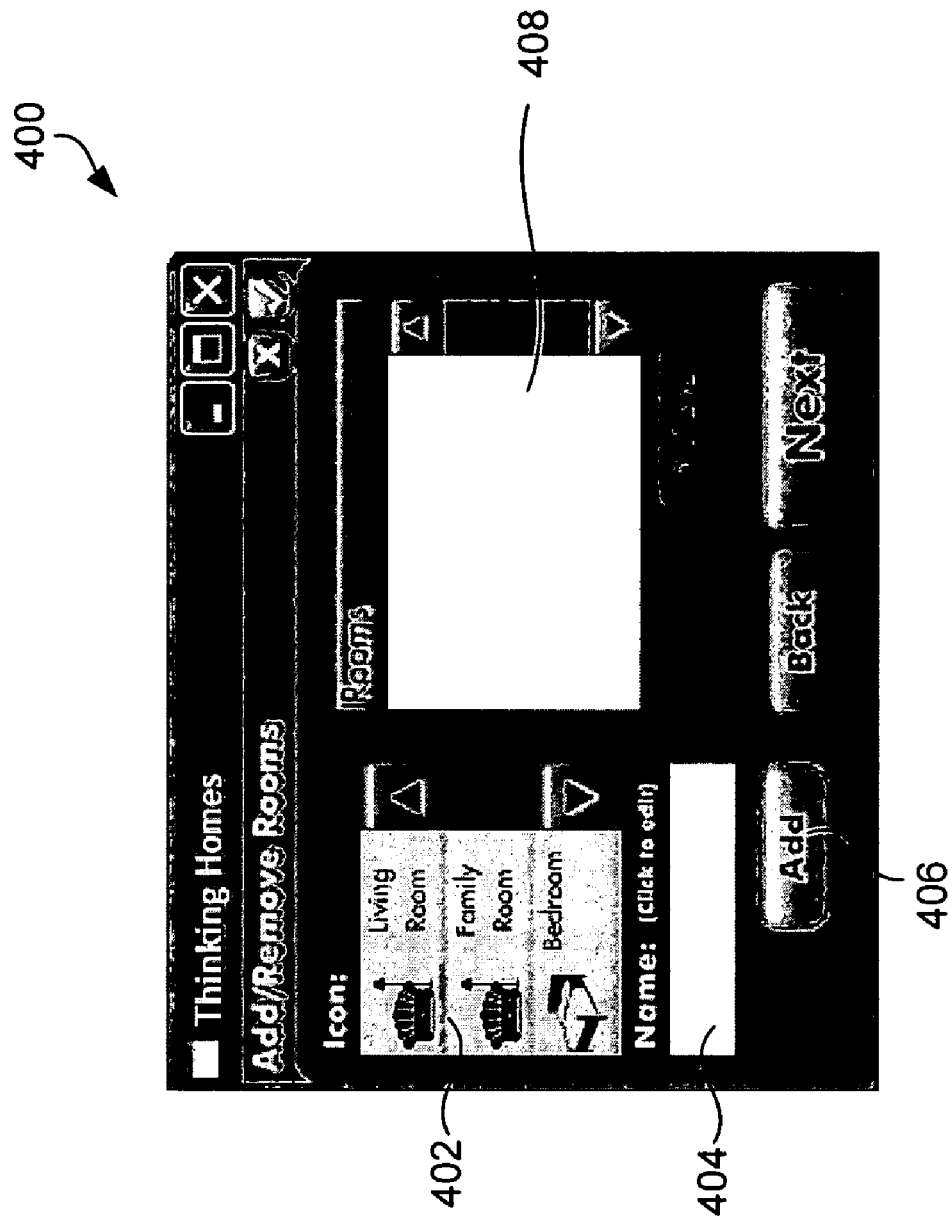
FIGS. 4a-4b illustrate a room control screen according to an embodiment of the present invention.
Figure 4B:
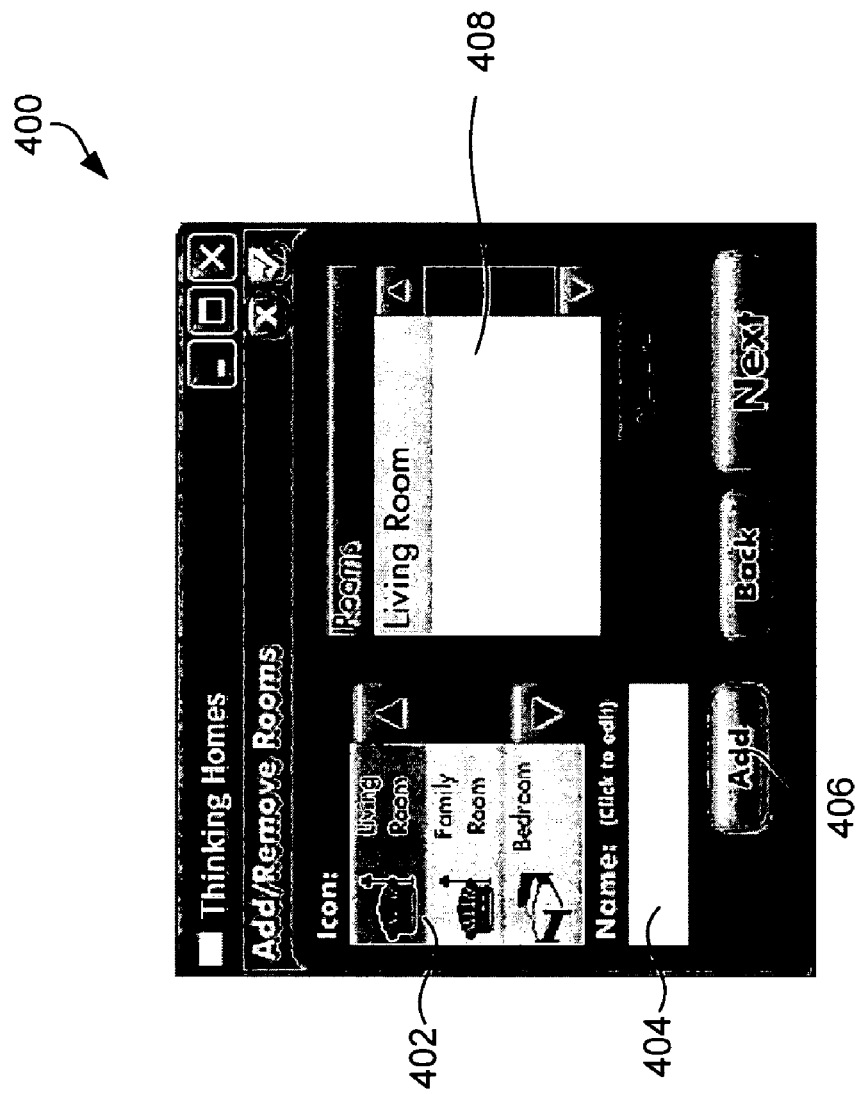

FIGS. 4a-4b illustrate a room control screen 400 in accordance with an embodiment of the present invention. Room control screen 400 can be included as part of a set-up wizard for adding and/or configuring a system component. Room control screen 400 allows the user to designate a room, or a region within a room, from a compilation 402 of available rooms or regions. The user can also add a new room or region by entering a description in room descriptor field 404 and activating the add button 406. Upon designating a room or region, the designated room or region appears in the active room window 408. As shown in FIG. 4b, the "living room" has been designated in the active room window 408. As can be seen, the descriptor "living room" is also highlighted in the compilation 402 of availabilities.

Referring back to FIG. 3 at step 306, any wireless controllers are assigned to the designated room from step 303. Wireless controllers include the bridges 130(a)-130(e) (including the "plug-and-play-enhanced" bridge 130(a)-130(e)) described above.

Figure 5:
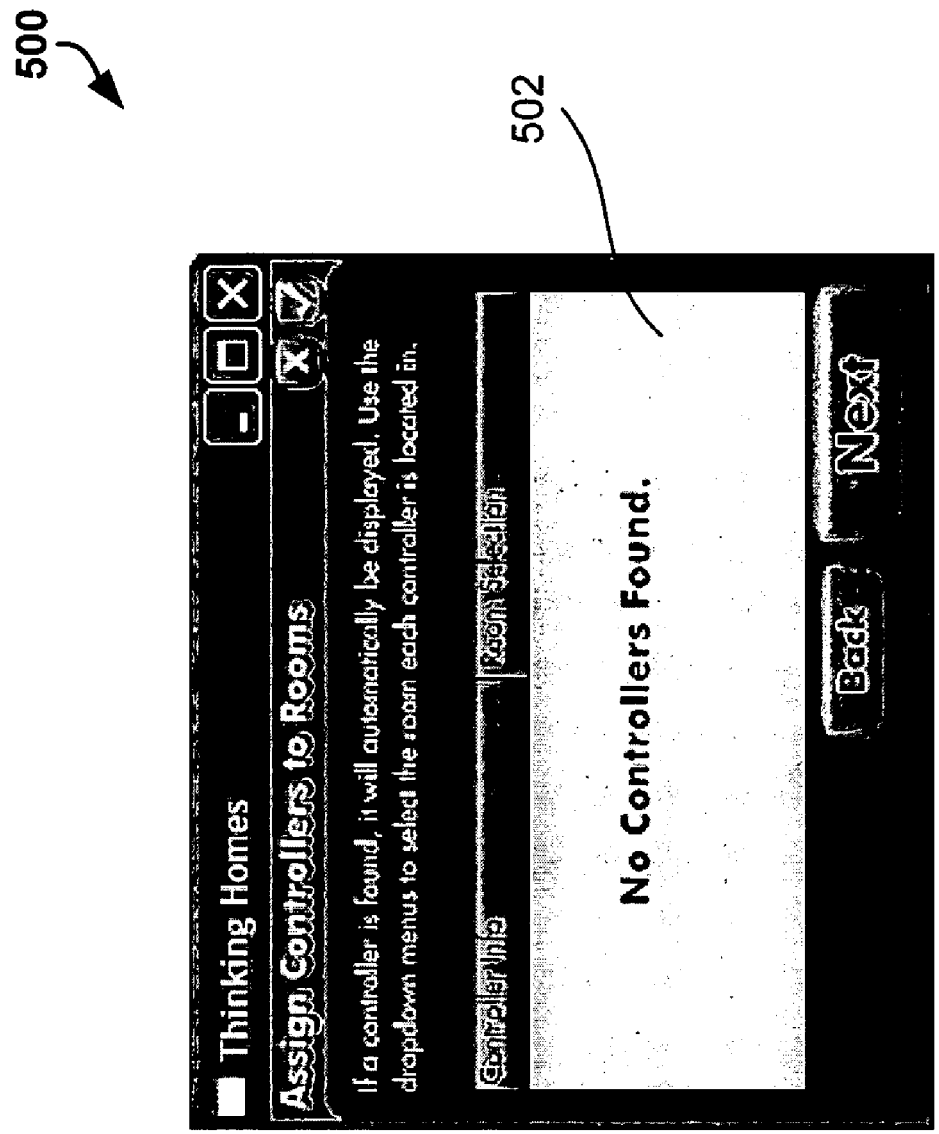
FIG. 5 illustrates a wireless controller device control screen according to an embodiment of the present invention.

FIG. 5 illustrates a wireless controller device control screen 500 that can be included as part of a set-up wizard for assigning wireless controllers, according to embodiment of the present invention. Controller information window 502 is populated with all wireless controllers communicatively coupled to the controlled environment (e.g., system 100). In an embodiment, the wireless controllers (e.g., wireless controllers having a plug and play protocol interface, or a "virtual" plug and play protocol interface, as described above) are automatically discovered and identified in controller information window 502. Controller information window 502 also specifies the room(s) or region(s) that a discovered wireless controller has been assigned. In other embodiments, a user can manually input or modify device information (including the room/region assignment) about a wireless controller.

Referring back to FIG. 3 at step 309, any non-legacy devices within the designated room or region are detected and assigned. As discussed, system components having a plug and play protocol interface are automatically discovered, and relevant device information about the discovered component is collected. In an embodiment, the user has the option of excluding the detected non-legacy device from being controlled within the controlled environment (e.g., system 100).

Figure 6:
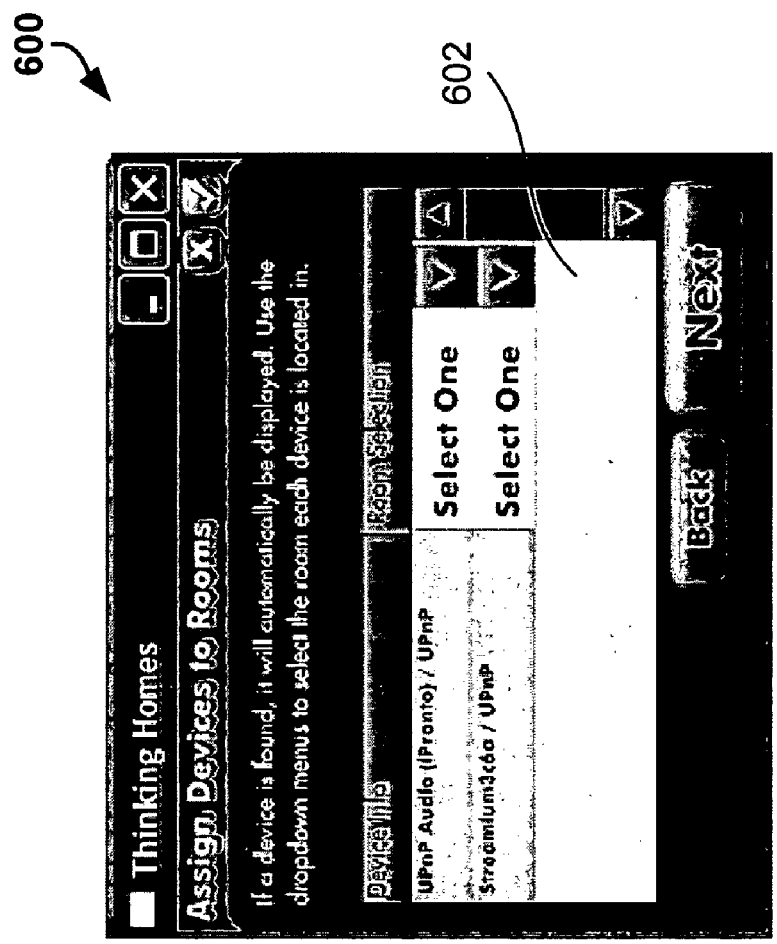
FIG. 6 illustrates a non-legacy device control screen according to an embodiment of the present invention.

FIG. 6 illustrates a non-legacy device control screen 600 that can be included as part of a set-up wizard for assigning non-legacy devices, according to embodiment of the present invention. Device information window 602 is populated with all non-legacy devices communicatively coupled to the controlled environment (e.g., system 100). Having a discovery protocol interface, non-legacy devices are automatically discovered and identified in device information window 602. Device information window 602 also specifies the room(s) or region(s) that a discovered non-legacy device has been assigned. In other embodiments, a user can manually input or modify device information (including room/region assignment) about a non-legacy device.

Referring back to FIG. 3 at step 312, any legacy devices are assigned to the designated room or region. In an embodiment of the present invention, one or more legacy devices are communicatively coupled to a plug-and-play-enhanced wireless controller (such as, a plug-and-play-enhanced bridge 130(a)-130(e) described above). As such, a virtual plug and play protocol interface enables the coupled legacy device to be discovered, and relevant device information about the discovered legacy device is collected. In an embodiment, a user has the option of excluding a discovered legacy device from being controlled. In another embodiment, a user can manually assign a legacy device (e.g., legacy devices not coupled to a plug-and-play-enhanced wireless controller) to the controlled environment (e.g., system 100).

Figure 7:
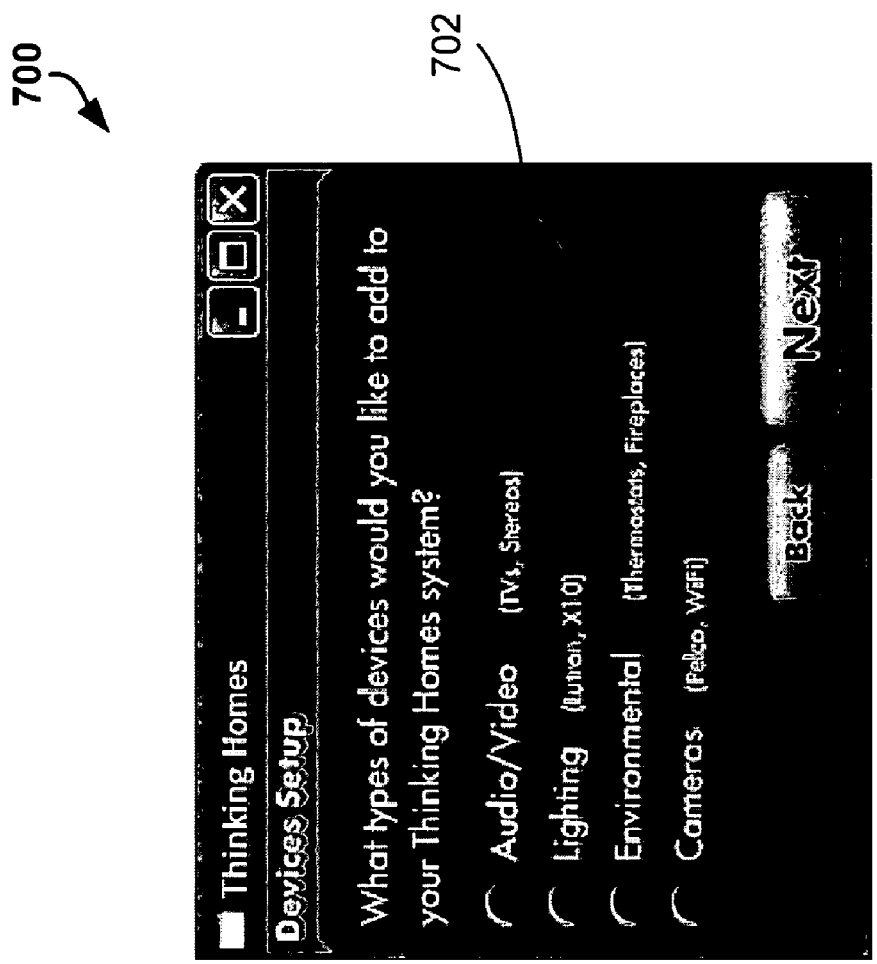
FIG. 7 illustrates a legacy device control screen according to an embodiment of the present invention.
Figure 8:
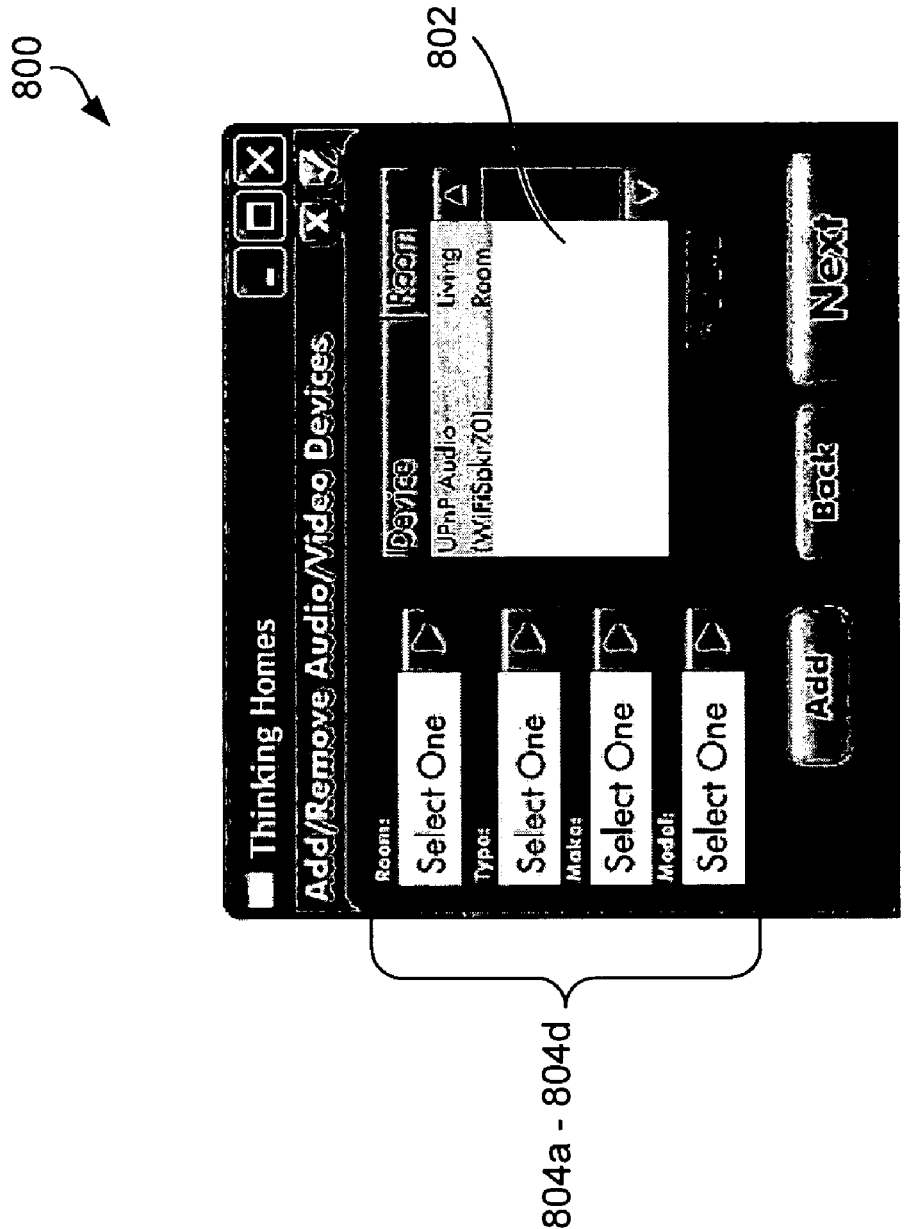
FIG. 8 illustrates a legacy device control screen according to another embodiment of the present invention.

FIG. 7 and FIG. 8 illustrate a legacy device control screen 700 and legacy device control screen 800, which can be included as part of a set-up wizard for assigning legacy devices, according to embodiment of the present invention. Legacy device control screen 700 can be used to support manual assignment of legacy devices, and legacy control screen 800 can be used to support both manually assigned and automatically discovered legacy control devices.

Referring to FIG. 7, a device information window 702 specifies the device type for a legacy device that is being manually assigned. The device types "audio/video", "lighting", "environmental", and "cameras" are provided for illustrative purposes, and other device types are considered to be within the scope of the present invention. Upon specifying a device type, legacy device control screen 800 is presented as part of the setup wizard.

As shown, legacy device control screen 800 provides an example for adding, removing, or configuring an "audio/video" device. In an embodiment supporting a manual device assignment, the "audio/device" device type is specified in legacy device control screen 700. In another embodiment supporting automatic discovery of legacy devices (e.g., coupled to a plug-and-play-enhanced wireless controller), legacy device control screen 800 would be presented upon discovery of the legacy device. As shown in device information window 802, the discovered legacy device (or manually assigned device, if appropriate) is an "audio/video" device that has been discovered (or manually assigned, if appropriate) to the "living room." The device information fields 804a-804d are automatically populated (or manually completed, if appropriate) with the relevant device information (e.g., assigned room/region, device type, make, model, etc.).

Using a setup wizard (such as illustrated by device control screens 600, 700, and 800), various system components (both legacy and non-legacy devices) can be added, removed, or configured for control by system 100. During the setup process, relevant device information (e.g., device type, make, model, region assignment, etc.) is automatically discovered or added by user input. For a legacy device that is not automatically discoverable, the user adds the legacy device to system 100 by identifying the device (by device type, make, model, etc.) and assigning the device to a particular room/region via the set-up process (e.g., device control screens 600, 700, and 800).

The setup process is also designed to acquire basic operational information about each new device (such as, tuning rules, types and order of inputs, etc.) The basic operational information is also referred to as "device metadata" and includes information regarding the unique control behavior(s) or operational "idiosyncrasies" of a particular device. As described in greater detail below, device metadata is executed to ensure a system component is placed in the appropriate state or mode for executing activity-based or experienced-based operations of the present invention. Examples of device metadata include the input mode or state, input types, order of inputs, and tuning rules for operating a device. Device metadata is described in greater detail in the application entitled "Device Control System, Method, and Apparatus" (U.S. patent application Ser. No. 10/783,017), which is incorporated herein by reference in its entirety.

Figure 9:
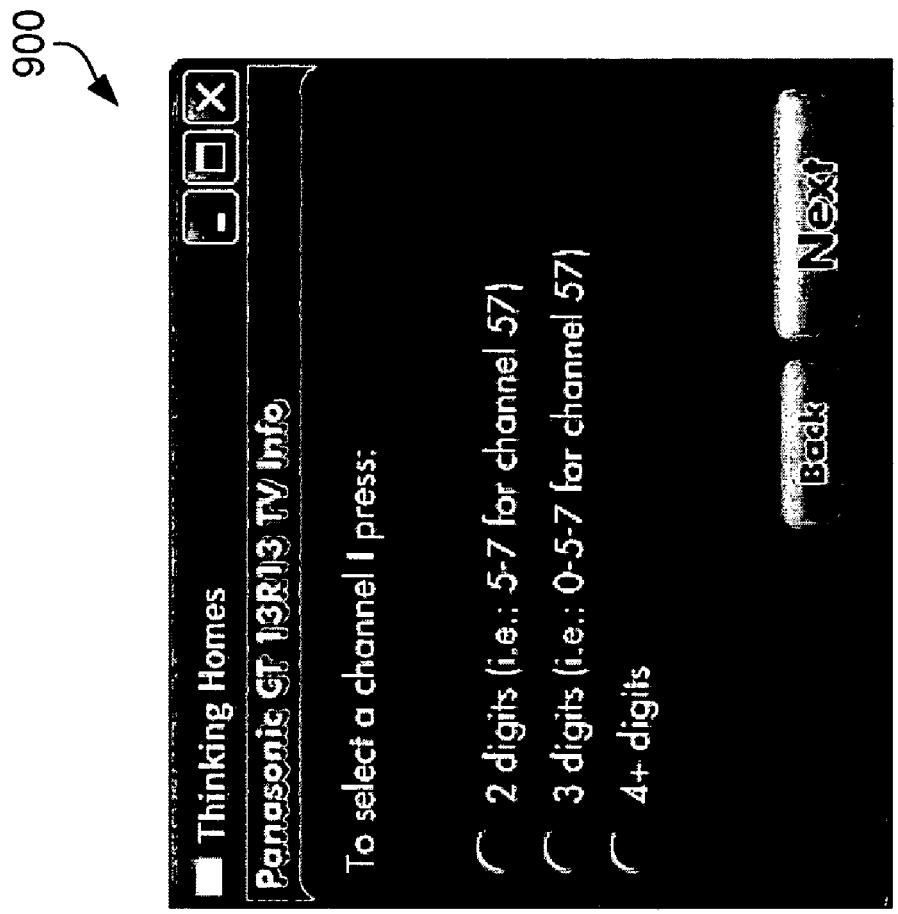
FIG. 9 illustrates a device control screen for specifying device metadata according to an embodiment of the present invention.
Figure 10:
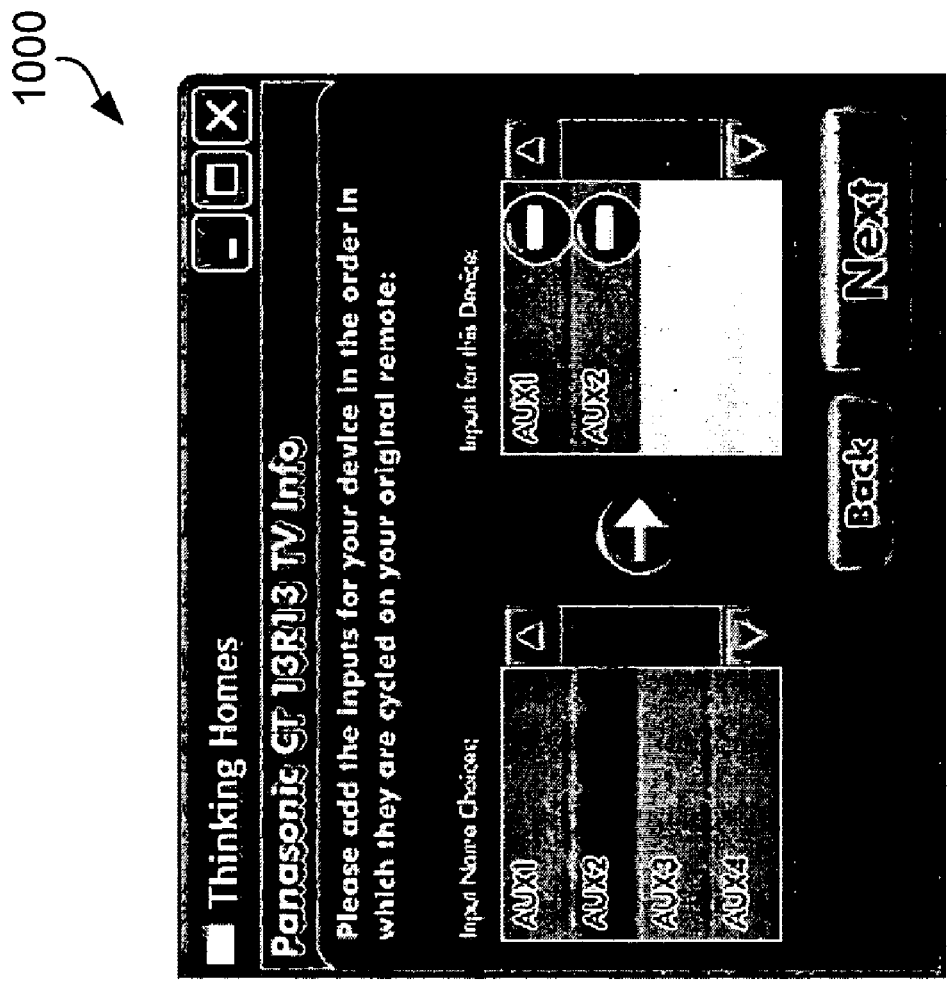
FIG. 10 illustrates a device control screen for specifying device metadata according to another embodiment of the present invention.

FIG. 9 and FIG. 10 illustrates device control screens 900 and 1000, respectively, that can be included as part of a set-up wizard for specifying device metadata, according to embodiment of the present invention. Device control screen 900 specifies the quantity of digits that are needed to change channels on a tuner. As shown, the tuner can accept two digits (i.e., channels 01 to 99), three digits (i.e., channels 001 to 999), or four digits (i.e., channels 001 to 999). The quantity of channel digits depends on the make and model of the system component (e.g., tuner 114) that is being configured.

Device control screen 1000 specifies the inputs and input order for controlling a system component. For example, a television can include two inputs "AUX1" and "AUX2." Input AUX1 can be used to receive input from a satellite receiver, and input AUX2 can be used to receive input from a DVD player.

The present invention includes mechanisms for optimizing the collection of device metadata with little or no human intervention. In an embodiment, a series of questions or informational prompts that comprise the set-up process can be dynamically optimized to avoid seeking irrelevant or unnecessary information. In an embodiment, device metadata is contained in an accessible database (such as, the metadata database described in the application entitled "Device Control System, Method, and Apparatus" (U.S. patent application Ser. No. 10/783,017), which is incorporated herein by reference in its entirety). As such, the setup process can be tailored and streamlined based on the type and model number of the system component being added or configured. For example, the setup process would avoid asking for information that either is already known via the metadata database or that is not relevant to that particular system component, such as types of inputs, tuning rules, power-on delay, etc. Instead, the setup process would be dynamically tailored to seek only that which is specific to and necessary to control the particular system component in light of its user-specific configuration (e.g., what devices are connected to the AV1 and AV2 inputs of a television).

Additionally, certain system components, such as some digital media adapters, provide some functions that can only be controlled via IR while other functions can be controlled through a wired interface. Based on the stored profile for such system components, the IR-controlled functions can be enumerated for and confirmed by the user during setup.

Referring back to FIG. 3 at step 315, the system components (e.g., the assigned legacy and non-legacy devices) are configured for activity-based or experienced-based operations. Once the device information (including device metadata) has been collected, one or more activity-based or experience-based operations can be created or defined both automatically or by the user. As discussed above, activity-based or experienced based operations include favorite settings, playlists, security protocols, context-sensitive operations, user-specific operations, follow-me system controls, control macros (including context-based control macros), and the like. Examples of activity-based or experience-based operations are provided in U.S. Pat. No. 6,792,323 to Krzyzanowski et al., which is incorporated herein by reference in its entirety; and the application entitled "Method, System, and Computer Program Product for Automatically Managing Components within a Controlled Environment" (U.S. patent application Ser. No. 10/782,923), which is incorporated herein by reference in its entirety.

If the activity-based or experienced-based operations have already been defined by the system (default operations) or a user, a new activity-based or experienced based operation is established after a new system component has been added to the controlled environment (as described above with reference to steps 303-312). For example, if a context-based control macro already exists for playing a DVD movie, and a new television is added to a bedroom, the existing control macro is updated to specify the new television as an optional system component for displaying the DVD movie upon activation of the control macro.

After creating or defining the activity-based or experienced-based operation(s), the control flow ends as indicated at step 395. Thus, the present invention includes a setup process that provides far more flexibility than other proprietary processes for setting-up a controlled environment (e.g., system 100). For example, the Harmony™ remote controller (available from Logitech) supports a setup scheme, whereby device-control information is gathered according to certain discrete user activities (e.g., watching a DVD, watching television, and listening to a radio). The Harmony™ remotes, however, have several limitations. For example, because the Harmony™ remotes are IR-based, they require direct line-of-sight connectivity with the devices they control, and therefore, can only control devices in a single room. Moreover, the Harmony™ remotes only allow one set of devices to be designated to participate in an activity. If the user has multiple devices of a particular type in a room (e.g., more than one TV), only one device of that type can be designated to participate in a user activity. In addition, the setup interface used by the Harmony™ remotes is only available through a personal computer having connectivity to a website via the Internet.

However, the present invention allows a user to define any number or any type of experiences that is desired, subject only to the kinds of devices available to the user and the manner in which such devices are interconnected. In other words, the setup process of the present invention allows the user to define activity-based or experience-based operations that can be executed with all possible media source-renderer combinations.

For example, unlike other proprietary setup schemes that lock users into a particular source in defining an activity, the present invention's setup process supports a number of activity-based or experience-based operations that utilize any available source, such as "Watch DVD from DVD player" and "Watch DVD from game console". By contrast, other proprietary schemes allow only a single "Watch DVD" experience that is confined to a single player/source, even though there may be two or more devices capable of playing a DVD.

The setup process of the present invention also supports activity-based or experience-based operations on multiple media renderers (e.g., "Watch DVD on TV" and/or "Watch DVD on projection TV"). By contrast, other proprietary schemes limit the user to one "Watch DVD" experience that is confined to a single rendering device, even though two or more valid rendering devices may be available.

Unlike other proprietary setup schemes that limit a user's ability to define activities to one device per type, the setup process of the present invention supports activity-based or experience-based operations that utilize source/renderer devices of the same type, such as "Watch DVD on TV-1" and "Watch DVD on TV-2"; or "Watch DVD-1 on TV" and "Watch DVD-2 on TV". By contrast, other proprietary setup schemes do not let the user define activities for more than one device of the same type.

The present invention's setup process contemplates use in a wireless network in which a single controller (e.g., portable controller 108) can control any system component in any room or region from any location in a controlled environment (e.g., system 100). Accordingly, each system component is assigned to a specific room or region. The user can then define activity-based or experience-based operations for each room or region using the system components available in that room or region.

The present invention contemplates control of multiple system components of the same type (e.g., two televisions in the same room). The user can define a plurality of the same activity-based or experience-based operations in the same room, using different sets and combinations of interconnected system components. For example, the user can setup multiple "Watch DVD" experiences using different DVD players and/or different TVs ("Watch Bedroom DVD player-1 on Bedroom TV-2" or "Watch Bedroom DVD player-2 on Bedroom TV-1"). Thus, multiple user-defined activity-based or experience-based operations can be created on a per-room basis.

In addition, the present invention accommodates system components that are accessible from multiple rooms or regions (shared) or that are connected to a switching device that sends its output to multiple rooms or regions (e.g., matrix switcher, multi-zone audio-video system, etc.).

Accordingly, the user can define a per-room/region activity-based or experience-based operation that is not necessarily limited to system components that are physically located in that particular room or region. For example, a "watch DVD in the master bedroom" experience can be defined using a DVD player located in the living room that is a shared device or that is accessible to the television (e.g., television 104) in the master bedroom via a switcher.

Based on the rooms/regions and experience categories that are defined, the present invention allows for a control interface to be generated that allows a user to navigate to the selected room/region, select an experience category (e.g., audio, video), and select a specific activity within the category (e.g., watch a movie on DVD player 1). Control interface examples are described in greater detail in the application entitled "User Interface for Multi-Device Control" (U.S. patent application Ser. No. 10/783,511), which is incorporated herein by reference in its entirety.

As described above, the setup process of the present invention contemplates use of "networked devices" such as plug and play media players (e.g., media player 116) and servers (e.g., server 208) that can be automatically discovered when they are powered on and connected to the controlled environment. Once a networked device is found, Applicants' set-up process will automatically display the device for the user and the user will be asked to assign that device to a particular room, if it is not automatically positioned in accordance with the location/positioning mechanisms of the present invention.

As described above, the setup process of the present invention also accommodates use of a bridge device that converts commands from a packet-based format (e.g., Ethernet or 802.11) to a format that is intelligible by most CE devices in existence today (IR or Serial). As disclosed in the application entitled "Legacy Device Bridge for Residential or Non-Residential Networks" (U.S. patent application Ser. No. 10/387, 590), the bridge device allows IR-controlled CD devices (which require direct line-of-sight connectivity to a remote control unit) to be connected to a WiFi network. Once connected to a controlled environment (e.g., system 100) via the bridge device, the user is not required to be in the same room as the device in order to control it. During the setup process, the user can assign a bridge device to control a particular CE device. (See device control screen 500 in FIG. 5).

According to an embodiment of the present invention, a user engages the setup process through a wireless portable controller (e.g., portable controller 108), not through a stationary PC-based interface. An advantage of the present invention is that the user is no longer required to setup devices by sitting in front of a personal computer (computer client 106) having a fixed location, which may not be anywhere near the CE devices at issue. Having the PC-based set-up interface in a location that is not proximately located to the devices that are being setup can result in significant inconvenience for the user. For example, certain information requires physical interaction with the CE device, such as identifying and labeling input cycles and determining IR delays which dictates how quickly commands can be sent to the device (e.g., the time it takes a television to change channels upon receiving a channel-entry command or the time it takes for the television to turn-on upon receiving a power-on command). The present invention obviates the inconvenience of having to run back and forth between the device and the personal computer in order to input the requested set-up information IV. Example Computer System FIGS. 1-10 are conceptual illustrations allowing an explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Figure 11:
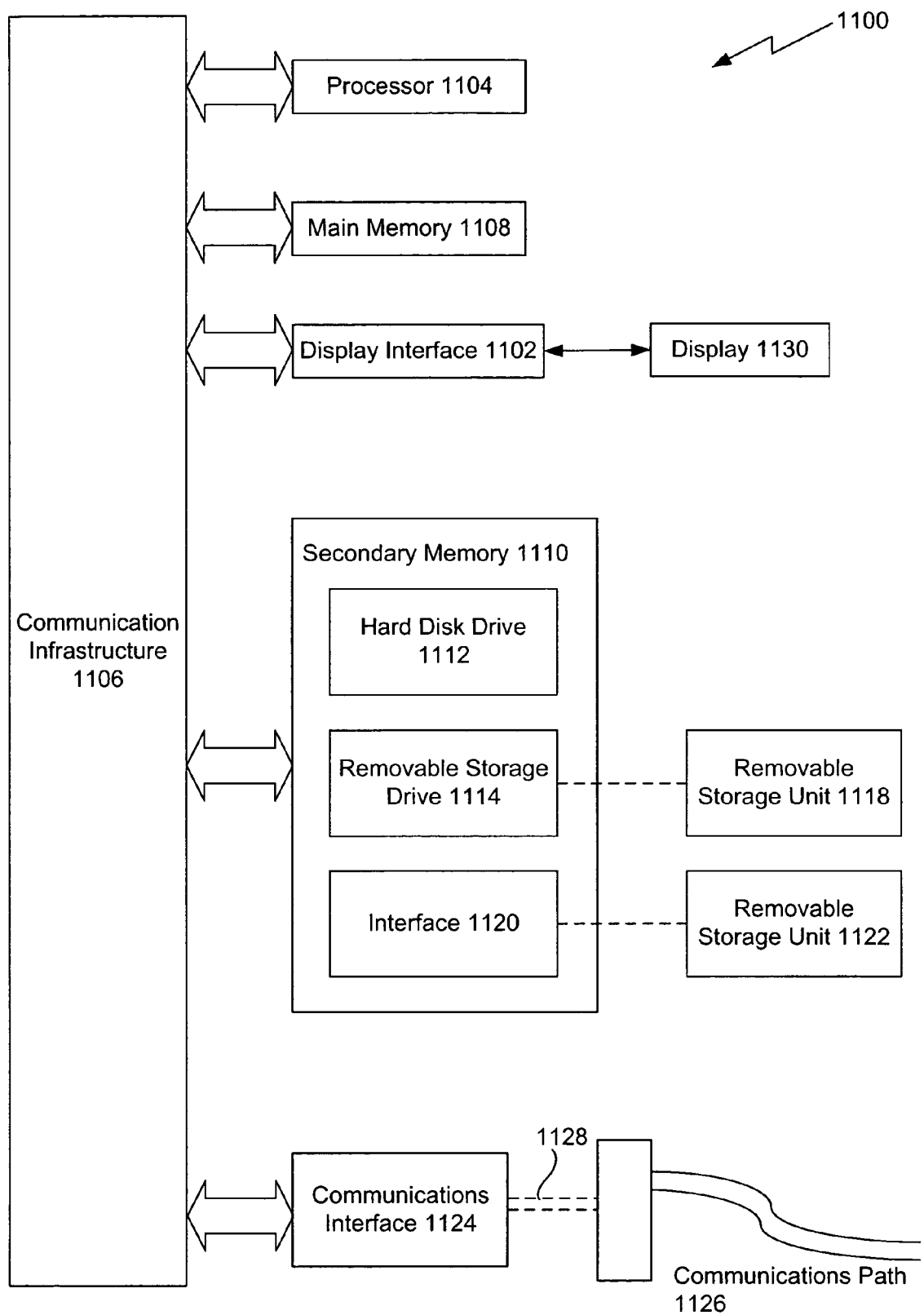
FIG. 11 is an example computer system useful for implementing the present invention.

Additionally, the present invention can be implemented in one or more computer systems or other processing systems, capable of carrying out the functionality described herein. Referring to FIG. 11, an example computer system 1100 useful in implementing the present invention is shown. Various embodiments are described in terms of this exemplary computer system 1100. After reading this description, it will become apparent to a person skilled in the relevant art(s) how to implement the invention using other computer systems and/or computer architectures.

The computer system 1100 includes one or more processors, such as processor 1104. Processor 1104 can be a special purpose or a general purpose digital signal processor. The processor 1104 is connected to a communication infrastructure 1106 (e.g., a communications bus, cross-over bar, or network).

Computer system 1100 can include a display interface 1102 that forwards graphics, text, and other data from the communication infrastructure 1106 (or from a frame buffer not shown) for display on the display unit 1130.

Computer system 1100 also includes a main memory 1108, preferably random access memory (RAM), and can also include a secondary memory 1110. The secondary memory 1110 can include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well-known manner. Removable storage unit 1118, represents a floppy disk, magnetic tape, optical disk, etc. which is read by and written to removable storage drive 1114. As will be appreciated, the removable storage unit 1118 includes a computer usable storage medium having stored therein computer software (e.g., programs or other instructions) and/or data.

In alternative embodiments, secondary memory 1110 includes other similar means for allowing software and/or data to be loaded into computer system 1100. Such means include, for example, a removable storage unit 1122 and an interface 1120. Examples of such means include a program cartridge and cartridge interface (such as that found in video game devices), a removable memory chip (such as, an EPROM or PROM) and associated socket, and other removable storage units 1122 and interfaces 1120 which allow software and data to be transferred from the removable storage unit 1122 to computer system 1100.

Computer system 1100 can also include a communications interface 1124. Communications interface 1124 allows software and/or data to be transferred between computer system 1100 and external devices. Examples of communications interface 1124 include a modem, a network interface (such as an Ethernet card), a communications port, a PCMCIA slot and card, etc. Software and data transferred via communications interface 1124 are in the form of signals 1128 which can be electronic, electromagnetic, optical or other signals capable of being received by communications interface 1124. These signals 1128 are provided to communications interface 1124 via a communications path (i.e., channel) 1126. Communications path 1126 carries signals 1128 and can be implemented using wire or cable, fiber optics, a phone line, a cellular phone link, an RF link, free-space optics, and other communications channels.

In this document, the term "computer program product" is used to generally refer to computer-readable storage media such as removable storage unit 1118, removable storage unit 1122, and a hard disk installed in hard disk drive 1112. These computer program products are means for providing software to computer system 1100. The invention, in an embodiment, is directed to such computer program products.

Computer programs (also called computer control logic or computer readable program code) are stored in main memory 1108 and/or secondary memory 1110. Computer programs can also be received via communications interface 1124. Such computer programs, when executed, enable the computer system 1100 to implement the present invention as discussed herein. In particular, the computer programs, when executed, enable the processor 1104 to implement the processes of the present invention, such as the method(s) implemented using, for example, portable controller 108, control screens 400-1000, and/or other system components of system 100 described above, such as method 300, for example. Accordingly, such computer programs represent controllers of the computer system 1100.

In an embodiment where the invention is implemented using software, the software can be stored in a computer program product and loaded into computer system 1100 using removable storage drive 1114, hard drive 1112, interfaces 1120, or communications interface 1124. The control logic (software), when executed by the processor 1104, causes the processor 1104 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Moreover as previously discussed, it should be understood that the method, system, and computer program product of the present invention should not be limited to a residential environment. The present invention can be implemented in other types of environments having a central processing system for distributing media and sending command and/or control signals to a plurality of devices and/or applications dispersed throughout a designated region. In addition to a residence, the designated region includes, but is not limited to, office complexes, suite of small offices, production studios, warehouses, entertainment arenas, health care facilities, hotels, vacation resorts, aircrafts, ships, automobiles, or the like. Thus, the present invention should not be limited by any of the above-described exemplary embodiments, but should be defined only in accordance with the following claims and their equivalents.

What is claimed is:

1. A method of controlling a plurality of devices to perform an activity-based or an experience-based operation, comprising the steps of:

collecting device information pertaining to identification of the plurality of devices including at least one of a manufacturer name for each of the devices, a model number of each of the devices, and a device type for each of the devices, wherein such device information is collected via a network discovery protocol;

accessing metadata that specifies unique requirements pertaining to control of the plurality of devices, including at least one of a device activation requirement, tuning requirement, and input state selection requirement;

accessing a sequence of device-specific commands based on said metadata and associated with the plurality of devices;

sending said sequence to the plurality of devices, whereby each device-specific command from said sequence is executable to control a corresponding device upon receipt of said device-specific command at said corresponding device;

defining a plurality of regions within a controlled environment; and assigning each of the plurality of devices to at least one of said regions within the controlled environment.

2. The method according to claim 1, wherein said accessing step comprises the step of:

querying a storage medium to access metadata for controlling the plurality of devices.

3. The method according to claim 2, wherein said storage medium is coupled locally to the plurality of devices.

4. The method according to claim 2, wherein said storage medium is remotely located from the plurality of devices.

5. The method according to claim 1, further comprising the step of:

sending the sequence of device-specific commands to a wired interface coupled to the plurality of devices.

6. The method according to claim 1, further comprising the step of:

sending the sequence of device-specific commands to a wireless interface coupled to the plurality of devices.

7. The method according to claim 1, further comprising the step of:

performing the activity-based or the experienced-based operation to implement one or more favorite settings defined for a user.

8. The method according to claim 1, further comprising the step of:
performing the activity-based or the experienced-based operation to play a playlist of media and/or multimedia.

9. The method according to claim 1, further comprising the step of:
performing the activity-based or the experienced-based operation to administer a security protocol established for the plurality of devices.

10. The method according to claim 1 further comprising the step of:
performing the activity-based or the experienced-based operation to synchronize an operation of one of the plurality of devices with an operation of one or more additional of the plurality of devices receiving a sequence of commands from said controller.

11. The method of claim 1, wherein said defining step comprises the step of:
adding or removing regions from the controlled environment over a user-input interface on a controller.

12. The method of claim 1, wherein said assigning step comprises the step of:
adding or removing the one or more system components over a network discovery protocol interface on a controller.

13. The method of claim 1, wherein said assigning step comprises the step of:
adding or removing the one or more system components over a user-input interface on a controller.

14. The method according to claim 1, wherein said network discovery protocol is Universal Plug and Play (UPnP).

15. The method of claim 1, wherein said defining step comprises the step of:
adding or removing regions from the controlled environment over a user-input interface on a controller.

16. The method of claim 1, wherein said assigning step comprises the step of:
adding or removing the one or more system components over a network discovery protocol interface on a controller.

17. The method of claim 1, wherein said assigning step comprises the step of:
adding or removing the one or more system components over a user-input interface on a controller.

18. A computer program product comprising a computer-readable storage medium having a program stored thereon, which when executed by a processor, causes the processor to control a plurality of devices to perform an activity-based or an experienced-based operation, comprising:
first computer readable program code means for causing the processor to collect device information pertaining to identification of the plurality of devices including at least one of a manufacturer name for each of the devices, a model number of each of the devices, and a device type for each of the devices, wherein such device information is collected via a network discovery protocol;
second computer readable program code means for causing the processor to access metadata that specifies unique requirements pertaining to control of the plurality of devices, including at least one of a device activation requirement, tuning requirement, and input state selection requirement;
third computer readable program code means for causing the processor to access a sequence of device-specific commands based on said metadata and associated with the plurality of devices;
fourth computer readable program code means for causing the processor to send said sequence to said plurality of devices, wherein each device-specific command from said sequence is executable to control a corresponding device upon receipt of said device-specific command at said corresponding device;
fifth computer readable program code means for causing the processor to define a plurality of regions within a controlled environment; and
sixth computer readable program code means for causing the processor to assign each of the plurality of devices to at least one of said regions within said controlled environment.

19. A method of controlling a plurality of devices to perform an activity-based or an experience-based operation, comprising the steps of:
collecting device information pertaining to identification of the plurality of devices including at least one of a manufacturer name for each of the devices, a model number of each of the devices, and a device type for each of the devices, wherein such device information is collected via user input;
determining the specific metadata relating to unique requirements pertaining to control of the plurality of devices, including at least one of a device activation requirement, tuning requirement, and input state selection requirement, necessary to provide control of the plurality of devices based on the collected device information;
querying the user for the specific metadata;
accessing a sequence of device-specific commands based on said metadata and associated with the plurality of devices; and
sending said sequence to the plurality of devices, whereby each device-specific command from said sequence is executable to control a corresponding device upon receipt of said device-specific command at said corresponding device.

20. The method according to claim 19, wherein said determining step further comprises the step of:
processing the received information to dynamically tailor a series of questions or informational prompts to collect additional information pertaining to the plurality of devices.

21. The method according to claim 19, further comprising the step of:
sending the sequence of device-specific commands to a wired interface coupled to the device.

22. The method according to claim 19, further comprising the step of:
sending the sequence of device-specific commands to a wireless interface coupled to the device.

23. The method according to claim 19, further comprising the step of:
performing the activity-based or the experienced-based operation to implement one or more favorite settings defined for a user.

24. The method according to claim 19, further comprising the step of:
performing the activity-based or the experienced-based operation to play a playlist of media and/or multimedia.

25. The method according to claim 19, further comprising the step of:
performing the activity-based or the experienced-based operation to administer a security protocol established for the device.

26. The method according to claim 19, further comprising the step of:

performing the activity-based or the experienced-based operation to synchronize an operation of one of the plurality of devices with an operation of one or more additional of the plurality of devices receiving a sequence of commands from said controller.

27. A computer program product comprising a computer-readable storage medium having a program stored thereon, which when executed by a processor, causes the processor to control a plurality of devices to perform an activity-based or an experienced-based operation, comprising:

first computer readable program code means for causing the processor to collect device information pertaining to identification of the devices including at least one of a manufacturer name for each of the devices, a model number of each of the devices, and a device type for each of the devices, wherein such device information is collected via user input;

second computer readable program code means for causing the processor to determine the specific metadata relating to unique requirements pertaining to control of the plurality of devices, including at least one of a device activation requirement, tuning requirement, and input state selection requirement, necessary to provide control of the device based on the collected device information;

third computer readable program code means for causing the processor to query the user for the specific metadata;

fourth computer readable program code means for causing the processor to access a sequence of device-specific commands based on said metadata and associated with the plurality of devices; and fifth computer readable program code means for causing the processor to send said sequence to said plurality of devices, wherein each device-specific command from said sequence is executable to control a corresponding device upon receipt of said device-specific command at said corresponding device.

* * * * *